United States Patent
Toyoda

(10) Patent No.: US 9,007,483 B2
(45) Date of Patent: Apr. 14, 2015

(54) IMAGE SYNTHESIS DEVICE AND COMPUTER PROGRAM FOR IMAGE SYNTHESIS FOR SYNTHESIZING A PLURALITY OF IMAGES OF DIFFERENT EXPOSURE TIMES

(71) Applicant: Fujitsu Limited, Kawasaki-shi, Kanagawa (JP)

(72) Inventor: Yuushi Toyoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 98 days.

(21) Appl. No.: 13/780,612

(22) Filed: Feb. 28, 2013

(65) Prior Publication Data
US 2013/0242122 A1    Sep. 19, 2013

(30) Foreign Application Priority Data

Mar. 16, 2012 (JP) ................................. 2012-059827
Nov. 21, 2012 (JP) ................................. 2012-255419

(51) Int. Cl.
H04N 5/228    (2006.01)
H04N 5/232    (2006.01)
G06T 11/00    (2006.01)

(52) U.S. Cl.
CPC .............. *H04N 5/2327* (2013.01); *G06T 11/00* (2013.01)

(58) Field of Classification Search
CPC .................................................... H04N 5/3355
USPC ................. 348/222.1, 234, 235, 239
See application file for complete search history.

(56) References Cited

U.S. PATENT DOCUMENTS

| | | | | |
|---|---|---|---|---|
| 2008/0143841 | A1* | 6/2008 | Tico et al. ................. | 348/208.99 |
| 2009/0284610 | A1 | 11/2009 | Fukumoto et al. | |
| 2010/0026823 | A1 | 2/2010 | Sawada | |
| 2010/0149384 | A1 | 6/2010 | Iijima et al. | |
| 2010/1570579 | | 6/2010 | Atanassov et al. | |
| 2011/0115942 | A1* | 5/2011 | Kurita et al. ................ | 348/223.1 |

(Continued)

FOREIGN PATENT DOCUMENTS

| | | |
|---|---|---|
| CN | 102025918 | 4/2011 |
| JP | 2007-202098 | 8/2007 |
| JP | 2007-324770 | 12/2007 |

(Continued)

OTHER PUBLICATIONS

Office Action mailed Feb. 5, 2014 in corresponding Korean Application No. 10-2013-0027977.

(Continued)

*Primary Examiner* — Gevell Selby
(74) *Attorney, Agent, or Firm* — Staas & Halsey LLP

(57) ABSTRACT

An image synthesis device includes: a first pixel selection unit which selects, from a first filter area around a pixel of interest on a first image, a first pixel having a value within a first allowable range including a value of a pixel of interest; a second pixel selection unit which sets a second filter area around a reference pixel located on a second image having a longer exposure time than the first image in the same position as the pixel of interest, and selects, from the second filter area, a second pixel having a value within a second allowable range including the value of the pixel of interest; and a synthesis unit which sets a synthetic value, acquired by synthesizing the values of the first and the second pixel, as the value of a pixel on the synthetic image in the same position as the pixel of interest.

21 Claims, 10 Drawing Sheets

(56) References Cited

U.S. PATENT DOCUMENTS

2012/0002082 A1* 1/2012 Johnson et al. .............. 348/234
2012/0194686 A1* 8/2012 Lin et al. .................... 348/208.4

FOREIGN PATENT DOCUMENTS

| | | |
|---|---|---|
| JP | 2009-284001 | 12/2009 |
| JP | 2010-141653 | 6/2010 |
| JP | 2011-44846 | 3/2011 |
| TW | 201036421 | 10/2010 |

OTHER PUBLICATIONS

Taiwanese Office Action dated Nov. 25, 2014 in corresponding Taiwanese Patent Application No. 102107282.

* cited by examiner

FIG.2A
FIG.2B
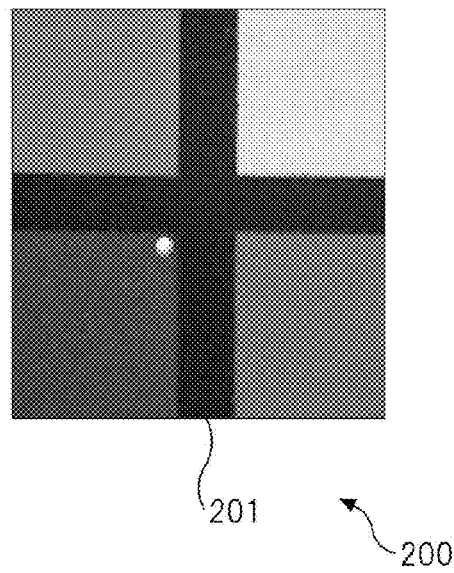
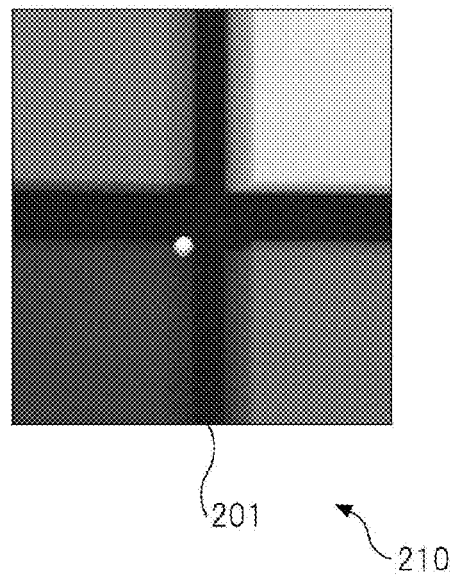

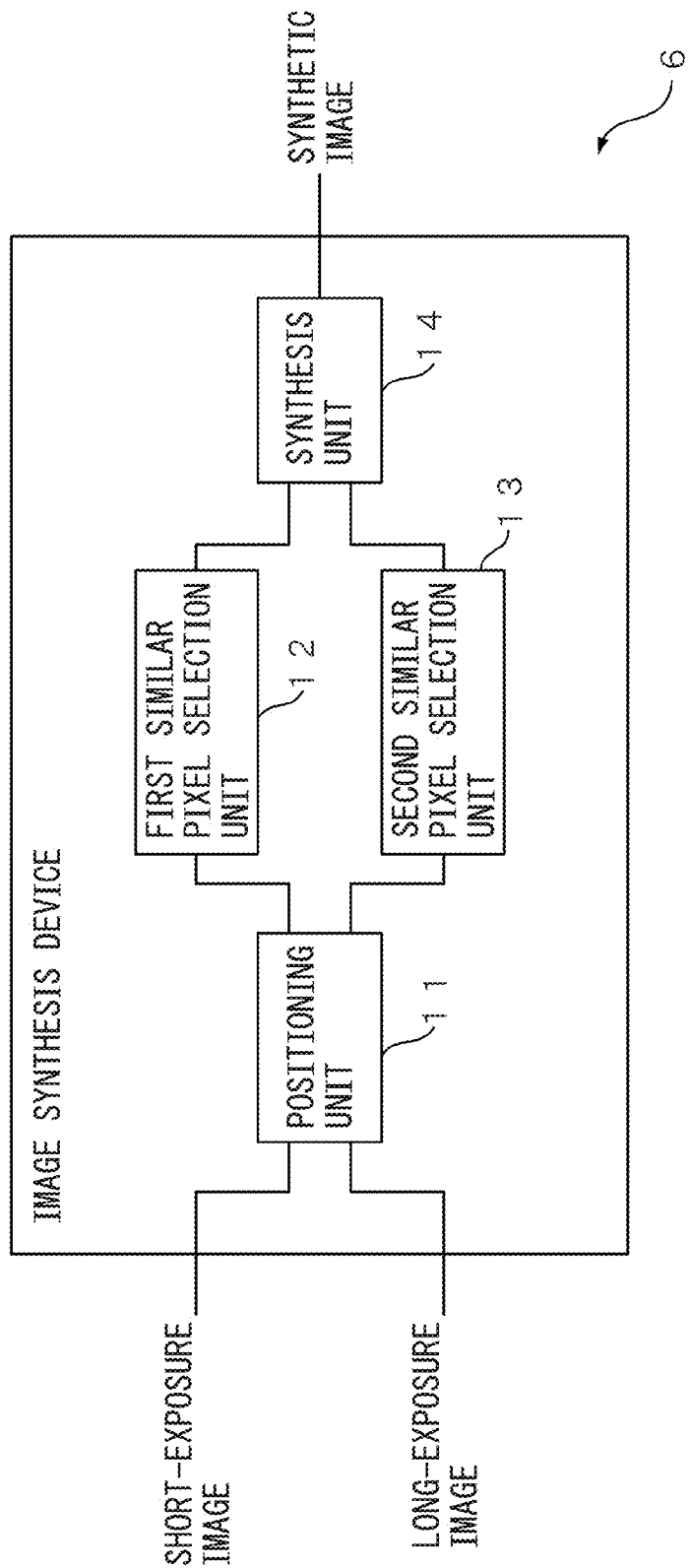

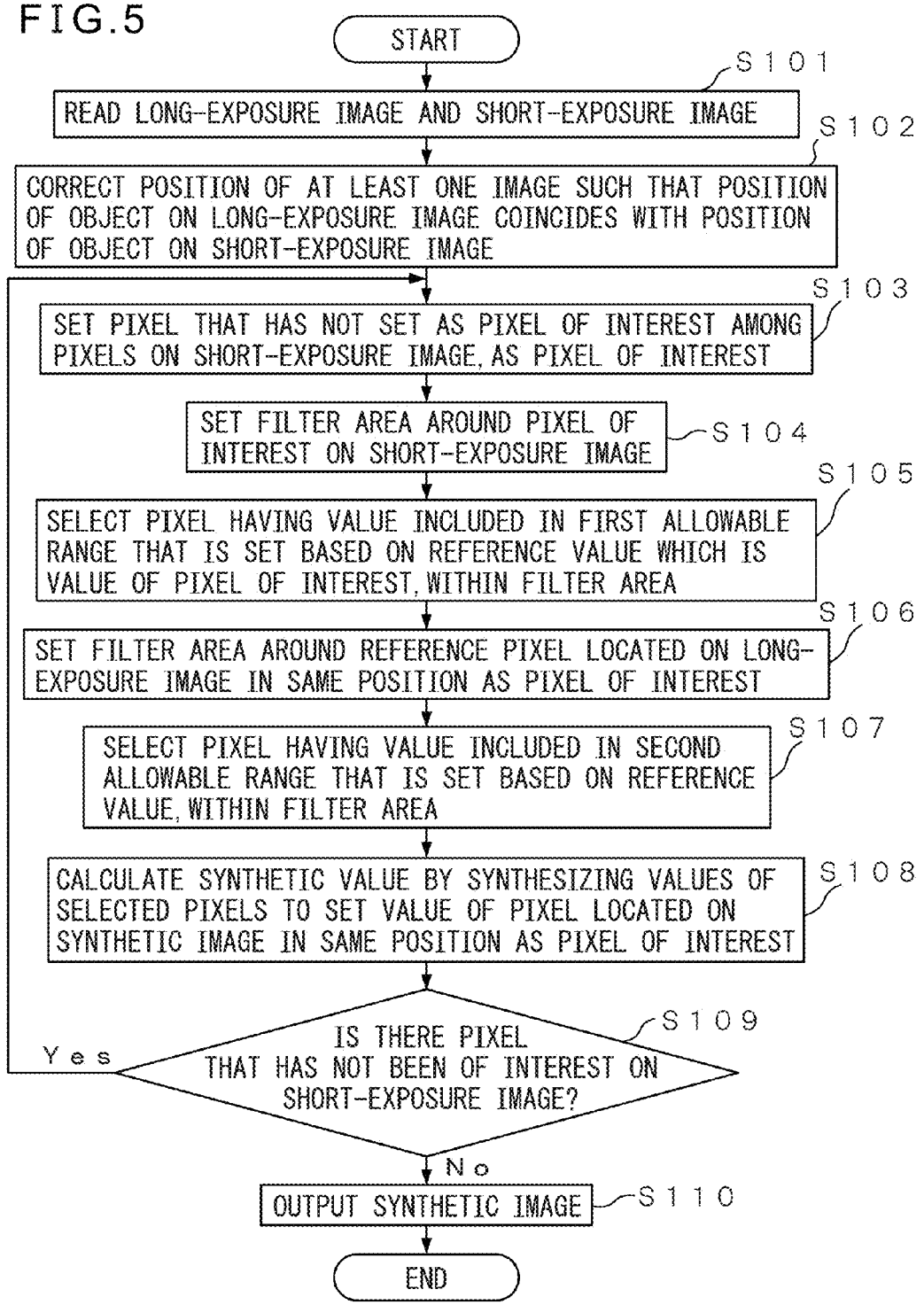

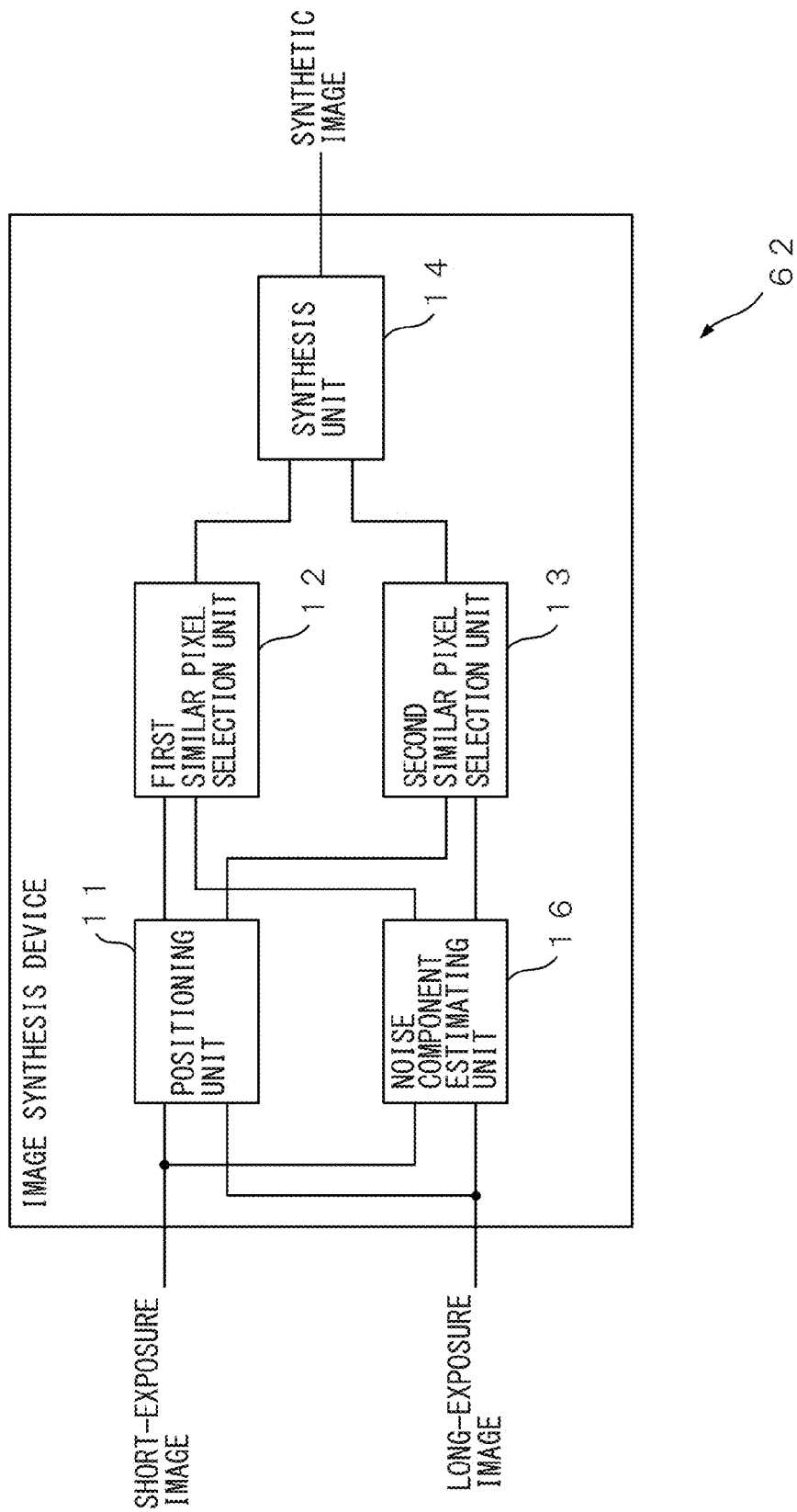

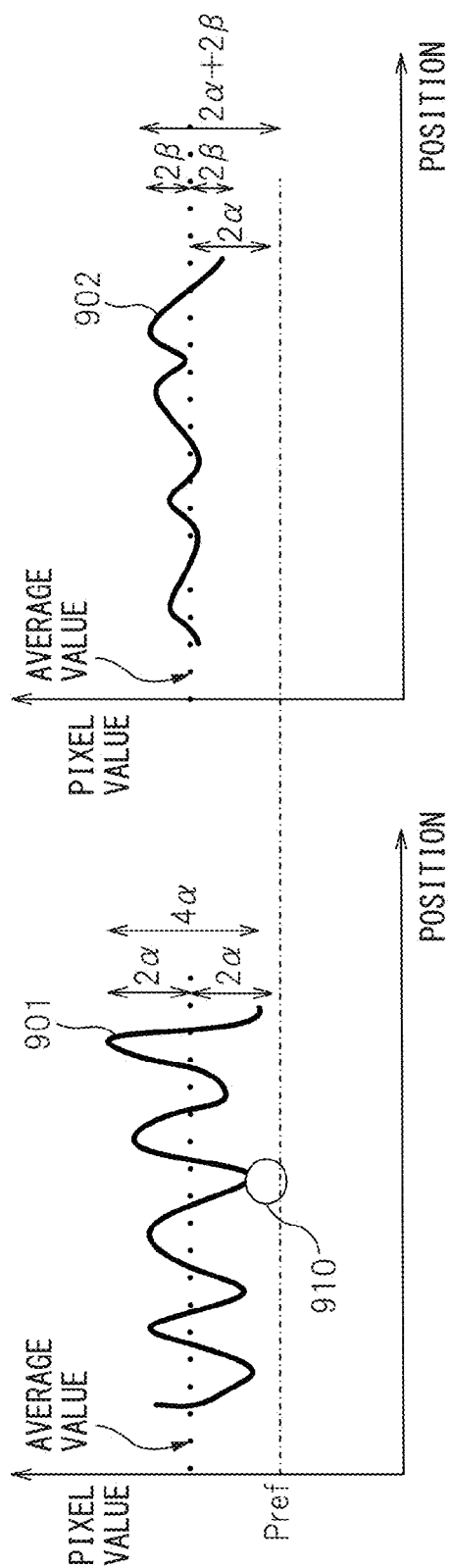

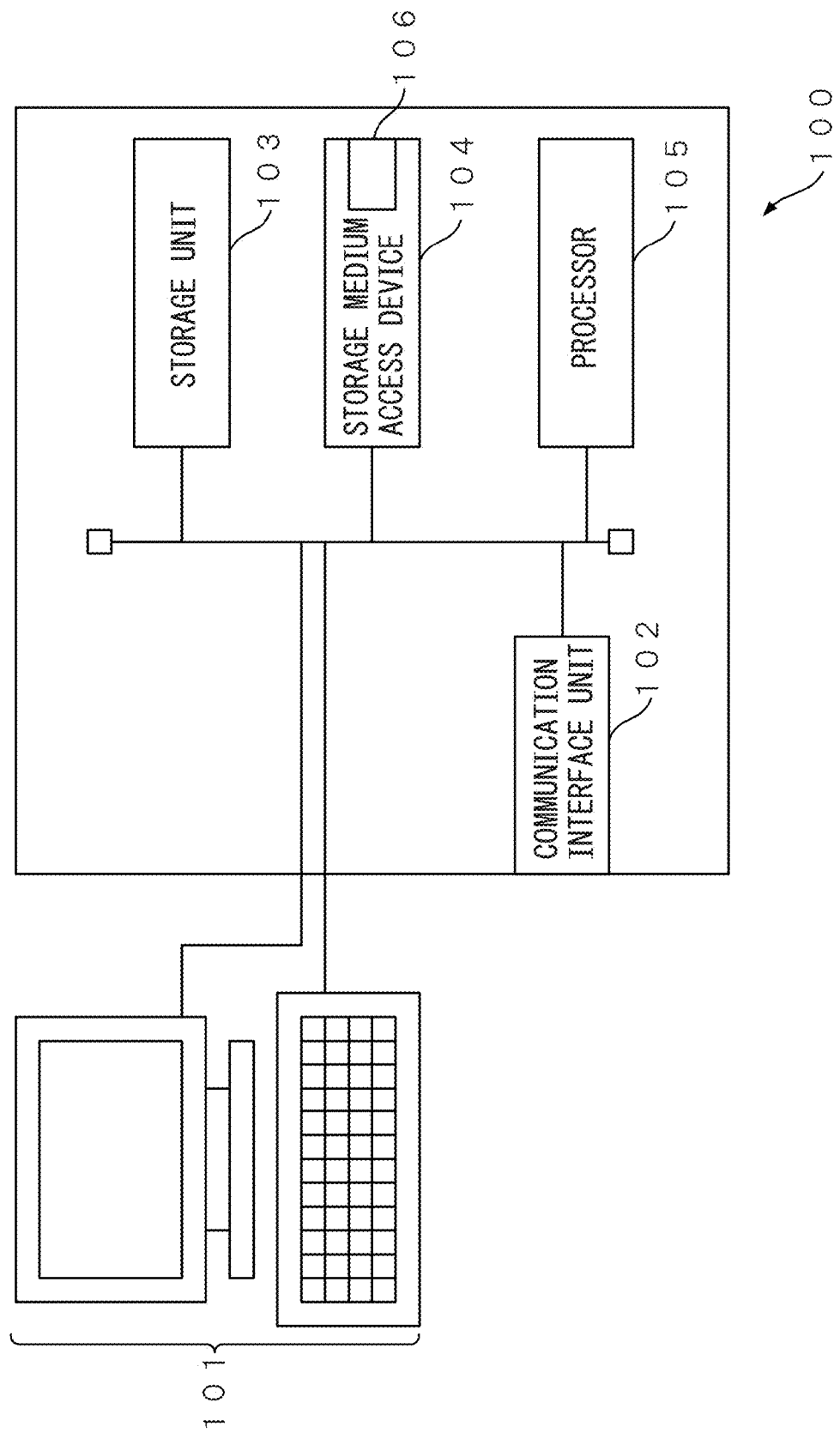

IMAGE SYNTHESIS DEVICE AND COMPUTER PROGRAM FOR IMAGE SYNTHESIS FOR SYNTHESIZING A PLURALITY OF IMAGES OF DIFFERENT EXPOSURE TIMES

CROSS-REFERENCE TO RELATED APPLICATION

This application is based upon and claims the benefit of priority of prior Japanese Patent Application No. 2012-59827, filed on Mar. 16, 2012, and Japanese Patent Application No. 2012-255419, filed on Nov. 21, 2012, and the entire contents of which are incorporated herein by reference.

FIELD

The embodiments discussed herein are related to an image synthesis device and an image synthesis method for synthesizing a plurality of images acquired by photographing an object at various exposure times.

BACKGROUND

When a user photographs an object by holding a camera by hand, the image of the object may blur due to camera shake when the shutter speed is slow. Techniques for correcting such blur due to camera shake by image processing have been studied. In particular, techniques for correcting blur due to camera shake by using a plurality of images acquired by photographing an object at various exposure times, in order to reduce the number of images to use for image correction, have been proposed (see, for example, Japanese Laid-Open Patent Publication No. 2007-324770, Japanese Laid-Open Patent Publication No. 2009-284001 and Japanese Laid-Open Patent Publication No. 2011-44846).

For example, Japanese Laid-Open Patent Publication No. 2007-324770 discloses an imaging device for acquiring images without blur and reduced noise, by a smaller number of images. The imaging device captures a plurality of images, including an image which has a short exposure time and high resolution but which contains a lot of noise, and an image which has a long exposure time but which contains little noise and has low resolution. Then, the imaging device separates edge blur and noise from a differential image between two images, based on a threshold value, and synthesizes the two images by changing the synthesis ratio between the images. At the time of synthesis, with respect to pixels that are determined to be edges, the imaging device increases the synthesis ratio of the image which has a short exposure time and high resolution but which contains a lot of noise.

Furthermore, Japanese Laid-Open Patent Publication No. 2009-284001 discloses an image processing device that generates a synthetic image by synthesizing the first image, a second image which is acquired by photographing under a shorter exposure time than the first image and low sensitivity, and a third image in which the high frequency components of the first image are filtered. The image processing device calculates the edge intensity values on a per pixel basis, increases the synthesis ratio of the first image with respect to pixels having greater edge intensity values, and increases the synthesis ratio of the second image with respect to pixels where the difference between the second image and the third image is less.

Furthermore, Japanese Laid-Open Patent Publication No. 2011-44846 discloses an image processing device that synthesizes a short-exposure image of a short exposure time and an adequate exposure image of a long exposure time. The image processing device divides the short-exposure image into a plurality of partial image areas, and increases the synthesis ratio of the short-exposure image to the adequate exposure image, when the edge intensity value with respect to the pixel position of interest is greater and the area edge amount for the partial image area where the pixel position of interest belongs is greater.

With any of the above techniques, for the edge areas where the object's edges are captured, the synthesis ratio of an image of a short exposure time increase compared to an image of a long exposure time. Consequently, even in a synthesized image, the noise components to be contained in the edge areas increase relatively. Depending on cases, due to the difference between the amount of noise components contained in the edge areas and the amount of noise components contained in areas around the edge areas, the granularity of the edge areas becomes distinct, and, as a result, a synthetic image may give an impression of having poor overall quality to the user.

SUMMARY

According to one embodiment, an image synthesis device to generate a synthetic image by synthesizing the first image and a second image having a longer exposure time than the first image, is provided. This image synthesis device includes: a first pixel selection unit which sets a first filter area around a pixel of interest on the first image, and which selects, from the first filter area, a first pixel having a value within a first allowable range including a value of the pixel of interest; a second pixel selection unit which sets a second filter area around a reference pixel that is located on the second image in a same position as the pixel of interest, and which selects, from the second filter area, a second pixel having a value within a second allowable range including the value of the pixel of interest; and a synthesis unit which sets a synthetic value, acquired by synthesizing the value of the first pixel and the value of the second pixel, as a value of a pixel located on the synthetic image in the same position as the pixel of interest.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2A is a diagram illustrating an example of a short-exposure image.

FIG. 2B is a diagram illustrating an example of a long-exposure image.

FIG. 3 is a configuration diagram of an image synthesis device according to a first embodiment.

FIG. 5 is an operation flowchart of image synthesis processes executed by an image synthesis device.

FIG. 8 is a configuration diagram of an image synthesis device according to a third embodiment.

FIG. 9A is a diagram illustrating a relationship between a first allowable range and a noise component superimposed in a short-exposure image.

FIG. 9B is a diagram illustrating a relationship between a second allowable range and a noise component superimposed in a long-exposure image.

FIG. 10 is a configuration diagram of a computer that operates as an image synthesis device by executing a computer program to realize the functions of the units of an image synthesis device according to each embodiment or its variation.

DESCRIPTION OF EMBODIMENTS

Image synthesis devices according to several embodiments will be described with reference to the accompanying drawings.

To reduce blur due to camera shake, the image synthesis device generates a synthetic image by synthesizing an image that has a relatively long exposure time and that is photographed by an adequate amount of exposure, and an image that is photographed by a relatively short exposure time. Note that, for ease of explanation, an image that has a relatively long exposure time and that is photographed in an adequate amount of exposure will be referred to as a long-exposure image, and an image that is photographed by a shorter exposure time than the exposure time of the long-exposure image will be referred to as a short-exposure image. The image synthesis device selects, from a filter area that is set around an arbitrary pixel of interest that is set on a short-exposure image, pixels having values within the first allowable range of pixel values that is determined based on the value of the pixel of interest as a reference value. Likewise, the image synthesis device also selects, from a filter area that is set around a reference pixel that is located in the same position as the pixel of interest on the long-exposure image, pixels having values within a second allowable range of pixel values that is determined based on the value of the pixel of interest as a reference value. Then, the image synthesis device reduces blur due to camera shake and reduces the noise components, with respect to the edge areas, by making the synthetic value acquired by synthesizing the values of selected pixels, be the value of the pixel located in the same position as the pixel of interest in the synthetic image.

In the present embodiment, the image to be the target of processing is a color digital image that is represented by the RGB color system and that has 8-bit gradation per color. The pixel values in the following descriptions represent components of specific colors. Then, the processes, which will be described below, are executed for every color component.

Note that the number of bits to represent the gradation of each color component is not limited to 8 bits and may be, for example, 4 bits or 10 bits. The image to be the target of processing may as well be a color digital image that is represented by other color systems such as the YUV color system or the HSV color system. In this case, the pixel values in the following descriptions represent components such as hue, saturation, and brightness. Then, the following processes are executed per component. Alternatively, the image to be the target of processing may also be a gray image in which each pixel has only a brightness value.

Figure 1:
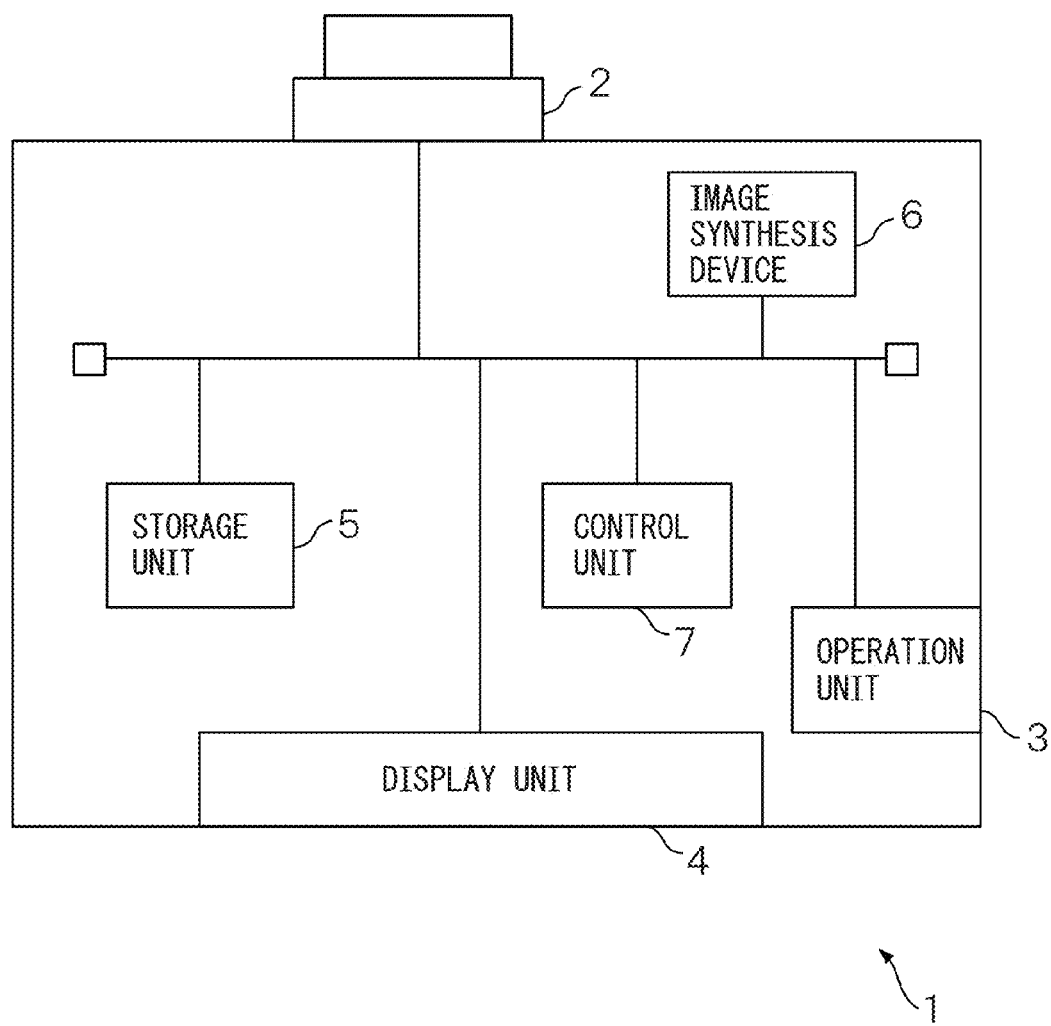
FIG. 1 is a configuration diagram of an imaging device in which an image synthesis device is incorporated.

FIG. 1 is a schematic configuration diagram of an imaging device in which an image synthesis device according to one embodiment is incorporated. An imaging device 1 is an imaging device that is capable of generating a plurality of images having varying exposure times by photographing an object continuously in varying exposure times, and is, for example, a mobile telephone mounting a camera or a digital camera. As illustrated in FIG. 1, the imaging device 1 includes a camera module 2, an operation unit 3, a display unit 4, a storage unit 5, an image synthesis device 6, and a control unit 7. Furthermore, the imaging device 1 may include an interface circuit (not illustrated) that complies with a serial bus standard such as the universal serial bus, to connect the imaging device 1 with other devices such as computers and televisions. Furthermore, the control unit 7 and the other units of the imaging device 1 are connected by, for example, buses.

The camera module 2 has an image sensor having an array of solid state imaging elements that are arranged in a two-dimensional arrangement, and an imaging optical system that forms an image of the object on the image sensor. Then, the camera module 2 generates an image, in which the object is captured, with the aperture diameter and shutter speed notified from the control unit 7. In the present embodiment, the camera module 2 photographs the object with an aperture diameter and shutter speed adjusted to give an adequate amount of exposure, and generates a long-exposure image. Furthermore, the camera module 2 generates a short-exposure image, by photographing the object by the same aperture diameter as the aperture diameter used when generating the long-exposure image, and by increasing the shutter speed, for example, by 8 times. In other words, in the short-exposure image, the exposure time and the amount of exposure are ⅛, compared to the long-exposure image. Note that the above exposure time is one example, and the exposure time with respect to the short-exposure image may as well be, for example, ¼ or 1/16 of the exposure time of a long-exposure image.

Furthermore, in order to correct the difference in brightness between the long-exposure image and the short-exposure image due to the difference in the amount of exposure, the camera module 2 adjusts the gain of the output signal from each solid state imaging element, and multiplies the value of each pixel of the short-exposure image by the ratio of the exposure time of the long-exposure image to the exposure time of the short-exposure image. Then, the camera module 2 stores the short-exposure image and the long-exposure image in the storage unit 5.

FIG. 2A is a diagram illustrating an example of a short-exposure image, and FIG. 2B is a diagram illustrating an example of a long-exposure image. In the short-exposure image 200 illustrated in FIG. 2A, edges of an object 201 having a cross shape are distinctly captured. However, in the short-exposure image 200, a proportion of noise components to the pixel value become relatively large, and therefore granularity becomes distinct on the whole. On the other hand, in the long-exposure image 210 illustrated in FIG. 2B, since blur is produced due to camera shake, the pixel values change gradually near the edges of the object 201, and therefore the edges become unclear. However, in the long-exposure image 210, noise components in the pixel values become relatively small, and therefore granularity is not distinct.

The operation unit 3 has, for example, various operation buttons or dial switches to allow the user to operate the imaging device 1. Then, the operation unit 3 transmits control signals for starting photographing, focusing and so on, and setup signals for setting the shutter speed, aperture diameter and so on, to the control unit 7, according to operations by the user.

The display unit 4 includes, for example, a display device such as a liquid crystal display device, and displays various information that is received from the control unit 7 or images generated by the camera module 2. Note that the operation unit 3 and the display unit 4 may be formed integrally, using, for example, a touch panel display.

The storage unit 5 includes, for example, a readable and writable, and volatile or non-volatile semiconductor memory circuit. The storage unit 5 stores images that are received from the camera module 2. The storage unit 5 passes an image to the image synthesis device 6 in response to a read request from the image synthesis device 6, and, furthermore, the storage unit 5 stores the synthetic image received from the image synthesis device 6. Furthermore, when the functions of the image synthesis device 6 are realized by a computer program that is executed on a processor provided in the control unit 7, the computer program may be stored.

The image synthesis device 6 generates the synthetic image in which blur due to camera shake is reduced, and in which noise components are reduced, by synthesizing the long-exposure image and the short-exposure image. Note that the image synthesis device 6 will be described later in detail.

The control unit 7 includes at least one processor and its peripheral circuitry, and controls the entirety of the imaging device 1. For example, the control unit 7 sets the shutter speed or aperture diameter in accordance with the setup signals received from the operation unit 3 and the amount of exposure to the object. The control unit 7 may adjust the color balance of the synthetic image generated by the image synthesis device 6, and execute processes such as edge emphasis or contrast emphasis.

Components of the image synthesis device 6 will be described. FIG. 3 is a configuration diagram of the image synthesis device 6. The image synthesis device 6 includes a positioning unit 11, a first similar pixel selection unit 12, a second similar pixel selection unit 13, and a synthesis unit 14. These units provided in the image synthesis device 6 may be formed as one integrated circuit in which circuits to correspond to the units are integrated. Alternatively, these units provided in the image synthesis device 6 may be formed as separate circuits as well.

The positioning unit 11 finds the amount of displacement between the position of the image of the object captured in the long-exposure image and the position of the image of the object captured in the short-exposure image. Then, the positioning unit 11 moves the image of the object captured in at least one of the long-exposure image and the short-exposure image to cancel the amount of displacement, thereby matching the positions of the images of the object on both images.

To find the amount of displacement, the positioning unit 11, for example, extracts at least one of feature points on the short-exposure image. For example, the positioning unit 11 detects each of a plurality of points by applying a corner detector to the short-exposure image as a feature point. Note that the positioning unit 11 may be able to use, for example, a Harris detector, as the corner detector. Furthermore, the positioning unit 11 may use other detectors for extracting feature points, to extract feature points from the short-exposure image. For example, as the detector, any of a Moravec detector, a smallest univalue segment assymilating nucleus (SUSAN) detector, a Kanade-Lucas-Tomasi (KLT) tracker, or a scale-invariant feature transform (SIFT) detector may be used.

Next, for every feature point extracted from the short-exposure image, the positioning unit 11 sets a predetermined area around the feature point as a template. Then, the positioning unit 11 calculates similarity by performing template matching while changing the relative position between the template and the long-exposure image, and decides the center position of the area where the similarity is the maximum, as a feature point on the long-exposure image corresponding to the feature point on the short-exposure image. In one embodiment, with respect to a feature point of interest, the positioning unit 11 sets the corresponding pixel on the long-exposure image, as a first search point. Then, the positioning unit 11 calculates the similarity with respect to the search point and 8 nearby pixels or 24 nearby pixels in the surrounding, and sets the pixel where the similarity is the maximum, as a next search point. Then, the positioning unit 11 may repeat the above processes until the search point no longer moves, and make the search point that is found the last be the feature point. The positioning unit 11 calculates, for example, a normalized cross-correlation value between the template and an area to be compared on the long-exposure image, as the similarity. Alternatively, the positioning unit 11 may calculate the reciprocal of the total sum $\Delta$ of the absolute values of the pixel value differences between corresponding pixels in the template and the area to be compared on the long-exposure image, or $1/(1+\Delta)$, as the similarity.

The positioning unit 11 may make a feature point on the short-exposure image and a corresponding point on the long-exposure image be a pair of feature points corresponding to the same part of the object, only when the maximum value of the above-described similarity is equal to or greater than a predetermined threshold value. In this case, when the maximum value of similarity is lower than the threshold value, the positioning unit 11 may determine that there is no feature point on the long-exposure image that matches the feature point corresponding to the template, and remove the feature point from the search target of pairs of feature points. As this predetermined threshold value is set higher, the positioning unit 11 is able to improve the reliability that the pair of feature points corresponds to the same part of the object. For example, the predetermined threshold value is set to a value given by multiplying the maximum value, which the similarity can take, by 0.8 to 0.9. Alternatively, the positioning unit 11 may increase the predetermined threshold value when a greater number of feature points are extracted from the short-exposure image. By this means, when the number of feature points extracted from one image is large, the positioning unit 11 is able to extract only pairs of feature points having a high possibility of corresponding to the same parts. Furthermore, even when the number of feature points extracted from one image is small, the positioning unit 11 is able to extract a sufficient number of pairs of feature points for matching the positions of the images of the object on both images.

Next, based on the pairs of feature points extracted, the positioning unit 11 calculates pairs of coordinate conversion parameters for matching the position of the object captured in the short-exposure image with the position of the object captured in the long-exposure image match. For example, the pairs of coordinate conversion parameters may be pairs of affine transformation coefficients to be applied to each pixel in at least one of the short-exposure image and the long-exposure image.

In this case, the positioning unit 11 determines the pairs of coordinate conversion parameters by, for example, the minimum mean square method. In particular, for each of a plurality of pairs of feature points, the positioning unit 11 converts the coordinates of the feature points of at least one of the short-exposure image and the long-exposure image, according to affine transformation, using each affine transformation coefficient included in the pairs of coordinate conversion parameters as a variable. Then, the positioning unit 11 calculates the mean value of the squares of the distances between feature points after the conversion, with respect to each pair of feature points. The positioning unit 11 finds the pair of coordinate conversion parameters where the square mean value is the minimum.

Note that the positioning unit 11 may find the pair of coordinate conversion parameters using any of various other positioning methods. For example, the imaging device 1 may incorporate a gyro sensor (not illustrated). In this case, based on output from the gyro sensor, the positioning unit 11 may find the angle between the photographing direction of the camera module 2 upon photographing the long-exposure image and the photographing direction of the camera module 2 upon photographing the short-exposure image, and find the above-described coordinate conversion parameters depending on the angle.

The positioning unit 11 performs affine transformation of the coordinates of each pixel of at least one of the short-exposure image and the long-exposure image using the found pair of coordinate conversion parameters. By this means, the positioning unit 11 is able to match the position of the image of the object captured in the long-exposure image with the position of the image of the object captured in the short-exposure image.

The positioning unit 11 outputs the short-exposure image, in which the position of the image of the object has been matched, to the first similar pixel selection unit 12, and outputs the long-exposure image, in which the position of the image of the object has been matched, to the second similar pixel selection unit 13.

The first similar pixel selection unit 12 sets each pixel on the short-exposure image as a pixel of interest, sequentially, and sets a predetermined filter area around the pixel of interest. Then, the first similar pixel selection unit 12 selects, from the filter area, each pixel with a value within the first allowable range that is set based on a reference value which is the value of the pixel of interest. Note that the filter area is, for example, a rectangular area having a size of 5 vertical pixels×5 horizontal pixels, around the pixel of interest. The first allowable range is set in a range corresponding to the fluctuation of pixel values anticipated from the noise produced in the electronic circuits in the imaging device 1, and the noise due to the fluctuation of the number of photons that are incident on imaging element corresponding to an individual pixel. The range is determined, for example, experimentally, and, when the pixel values are represented by 0 to 255, is set to the reference value ±25. Note that, as the amount of exposure upon photographing is smaller, the proportion of noise components in the pixel values increases, so that the first allowable range may be set wider as the amount of exposure of the short-exposure image is smaller. Alternatively, as the value of the pixel of interest is smaller, the first allowable range may be set wider.

The first similar pixel selection unit 12 notifies the synthesis unit 14 of information to represent the positions of the pixels selected on the short-exposure image.

The second similar pixel selection unit 13 sets, for the long-exposure image, a predetermined filter area around the reference pixel that is located in the same position as the pixel of interest on the short-exposure image. Then, the second similar pixel selection unit 13 selects, from the filter area, each pixel with a value within a second allowable range that is set based on the reference value which is the value of the pixel of interest.

Note that in the long-exposure image, a certain point on the object may be captured over a plurality of pixels due to camera shake. Consequently, the filter area set for the long-exposure image is preferably larger than the filter area set for the short-exposure image. For example, the filter area set for the long-exposure image is a rectangular area having a size of 9 vertical pixels×9 horizontal pixels, around the pixel of interest. Note that, when the direction of camera shake is estimated by, for example, the output of the gyro sensor incorporated in the imaging device 1 and so on, the second similar pixel selection unit 13 may set the filter size in the direction of camera shake bigger than the filter size in a direction that is orthogonal to the direction of camera shake. The second similar pixel selection unit 13 may, for example, set the filter area to have a width of 9 pixels around the reference pixel in the direction of camera shake and have a width of 5 pixels around the reference pixel in the direction that is orthogonal to the direction of camera shake.

Furthermore, the second allowable range set for the long-exposure image is preferably narrower than the first allowable range set for the short-exposure image. This is because, in the long-exposure image, the proportion of noise components in the pixel values is relatively low, and therefore the width of fluctuation of pixel values due to noise is small. For example, when the pixel values are represented by 0 to 255, the second allowable range is set to the reference value ±15.

Note that, as the amount of exposure for the long-exposure image is greater, the second similar pixel selection unit 13 may set the second allowable range narrower. The second similar pixel selection unit 13 may set the second allowable range narrower as a pixel has greater pixel value on the long-exposure image.

Figure 4B:
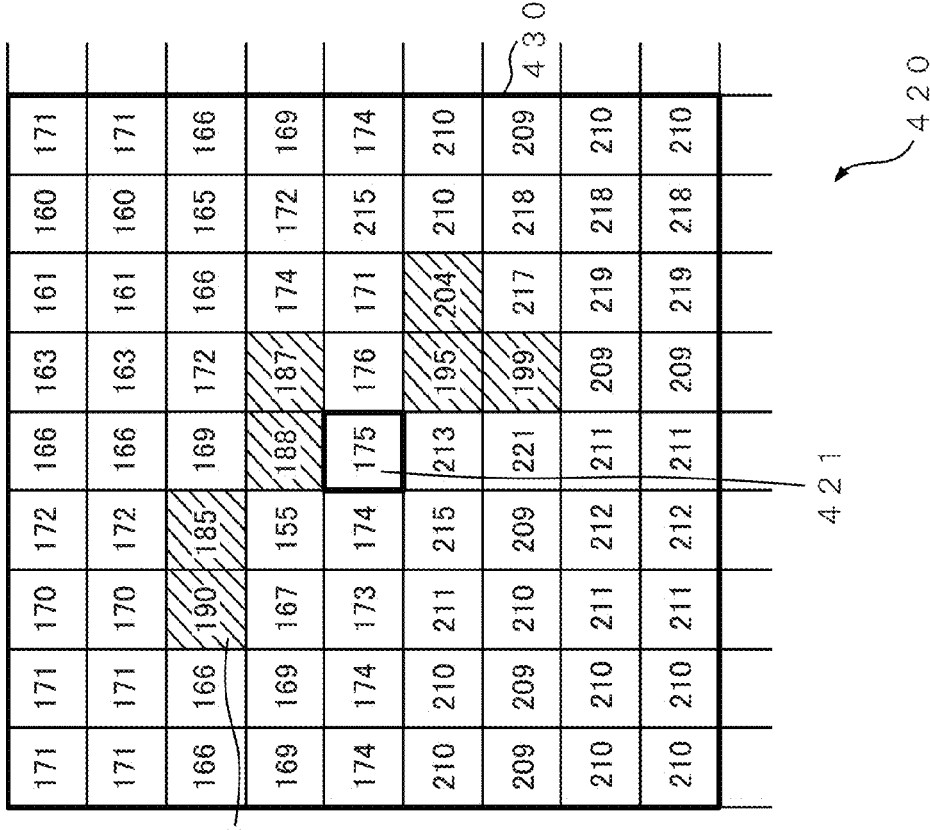
FIG. 4B is a diagram illustrating an example of a filter area that is set for a pixel of interest in a long-exposure image and pixels to be selected.
Figure 4A:
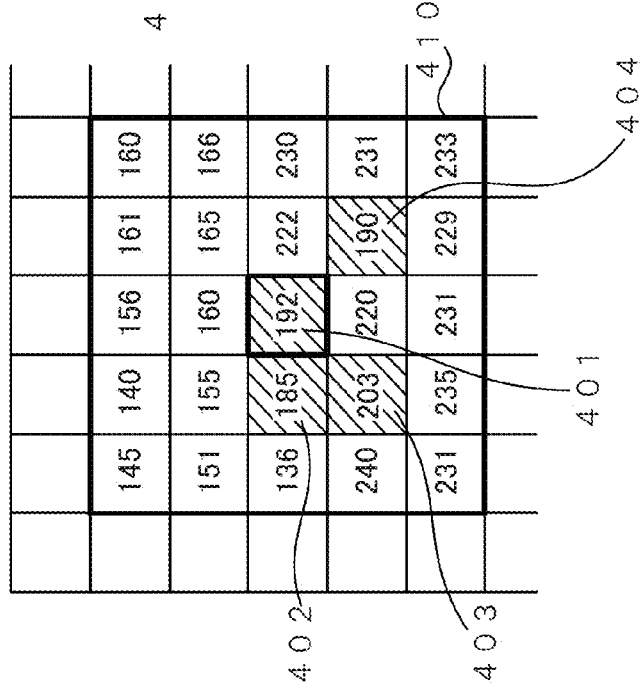
FIG. 4A is a diagram illustrating an example of a filter area that is set for a pixel of interest in a short-exposure image and pixels to be selected.

FIG. 4A is a diagram illustrating an example of a filter range that is set for a pixel of interest in a short-exposure image, and pixels to be selected. In FIG. 4A, the numerical value given in each pixel of a short-exposure image 400 represents the value of the pixel. In this example, a filter area 410 of 5 vertical pixels×5 horizontal pixels around a pixel of interest 401 is set. When the first allowable range has a range of ±25 from the pixel value 192 of the pixel of interest 401, besides the pixel of interest 401, a left-neighboring pixel 402 (pixel value 185) of the pixel of interest 401, a lower left pixel 403 (pixel value 203) and a lower right pixel 404 (pixel value 190) are selected.

FIG. 4B is a diagram illustrating an example of a filter range set for a long-exposure image 420, and pixels to be selected. In FIG. 4B, the numerical value given in each pixel represents the value of the pixel. In this example, a filter area 430 of 9 vertical pixels×9 horizontal pixels is set around a reference pixel 421 that is located in the same position as the pixel of interest. When the second allowable range is a range of ±15 from the pixel value 192 of the pixel of interest 401 illustrated in FIG. 4A, 7 pixels 422 illustrated in hatching are selected.

The second similar pixel selection unit 13 notifies the synthesis unit 14 of information to represent the positions of the selected pixels.

The synthesis unit 14 calculates the synthetic value by synthesizing the values of the pixels on the short-exposure image selected by the first similar pixel selection unit 12 and the values of the pixels on the long-exposure image selected by the second similar pixel selection unit 13, to set the value of the pixel located on the synthetic image in the same position as the pixel of interest. In the present embodiment, the synthesis unit 14 calculates the mean value of the selected pixels as the value of the pixel located on the synthetic image in the same position as the pixel of interest. For example, in the examples of selected pixels illustrated in FIG. 4A and FIG. 4B, the mean value is (192+185+203+190+190+185+ 188+187+195+204+199)/11=192.5, so that 192, which is the integer part of the mean value, is set as the value of the pixel of the same position as the pixel of interest.

Note that the synthesis unit 14 may set the median of the values of the pixels on the short-exposure image selected by the first similar pixel selection unit 12 and the values of the pixels on the long-exposure image selected by the second similar pixel selection unit 13 as the value of the pixel located on the synthetic image in the same position as the pixel of interest. In this case, in the examples of selected pixels illustrated in FIG. 4A and FIG. 4B, the median of the values of the selected pixels is 190, and therefore the value of the pixel of the same position as the pixel of interest is set to 190.

FIG. 5 is an operation flowchart of image synthesis processes executed by the image synthesis device 6. The image synthesis device 6 reads the long-exposure image and the short-exposure image from the storage unit 5 (step S101). Then, the positioning unit 11 moves the object in at least one of the long-exposure image and the short-exposure image such that the position of the object on the long-exposure image coincides with the position of the image of the object on the short-exposure image (step S102).

Among the pixels on the short-exposure image, the position of which has been matched, the image synthesis device 6 sets a pixel that has not been set as a pixel of interest (step S103). For example, the image synthesis device 6 sequentially sets each pixel as a pixel of interest, following the order of raster scan, from the upper leftmost pixel.

The first similar pixel selection unit 12 sets a filter area around the pixel of interest on the short-exposure image (step S104). Then, the first similar pixel selection unit 12 selects, in the filter area, each pixel with a value within the first allowable range that is set based on the reference value which is the value of the pixel of interest (step S105). The first similar pixel selection unit 12 notifies the synthesis unit 14 of information to represent the positions of the pixels selected from the short-exposure image.

The second similar pixel selection unit 13 sets, for the long-exposure image, a predetermined filter area around the reference pixel that is located in the same position as the pixel of interest on the long-exposure image (step S106). Then, the first similar pixel selection unit 12 selects, in the filter area, each pixel with a value within the first allowable range that is set based on the reference value which is the value of the pixel of interest (step S107). The second similar pixel selection unit 13 notifies the synthesis unit 14 of information to represent the positions of the pixels selected from the long-exposure image.

The synthesis unit 14 calculates the synthetic value, by synthesizing the values of the selected pixels, to set the value of the pixel located on the synthetic image in the same position as the pixel of interest (step S108). As noted above, the value acquired by synthesizing the values of the selected pixels can be, for example, the mean value or median of the values of the selected pixels.

Subsequently, the image synthesis device 6 decides whether or not a pixel that has not been set as the pixel of interest is still left on the short-exposure image (step S109). When the pixel that has not been set as the pixel of interest is still left on the short-exposure image (step S109—Yes), the image synthesis device 6 repeats the processes of step S103 and after the step S103.

On the other hand, when a pixel that has not been set as the pixel of interest is not left on the short-exposure image (step S109—No), the image synthesis device 6 outputs the synthetic image to the control unit 7 (step S110). Note that the image synthesis device 6 may store the synthetic image in the storage unit 5. Then, the image synthesis device 6 finishes the image synthesis process.

Note that the image synthesis device 6 may execute the processes of step S104 and S105 and the processes of step S106 and S107 in parallel. Alternatively, the image synthesis device 6 may switch the order of the processes of step S104 and S105 and the processes of step S106 and S107.

As described above, the image synthesis device sets a filter area having a certain size around a pixel of interest for both a long-exposure image and a short-exposure image, and selects, from the filter area, pixels having values close to the value of the pixel of interest. There is a high possibility that the object, which is same as the object captured in the pixel of interest, is captured in pixels selected in this way. Consequently, the image synthesis device is able to reduce blur due to camera shake. Furthermore, the image synthesis device generates a synthetic image by synthesizing the values of a plurality of selected pixels that are anticipated to capture the same part of the object, and therefore is able to reduce the noise components contained in the values of the pixels of the synthetic image.

Next, an image synthesis device according to a second embodiment will be described. The image synthesis device according to the second embodiment detects edge pixels where the object's edges are captured in the long-exposure image, and increases the filter area relatively when an edge pixel is set as the reference pixel.

Figure 6:
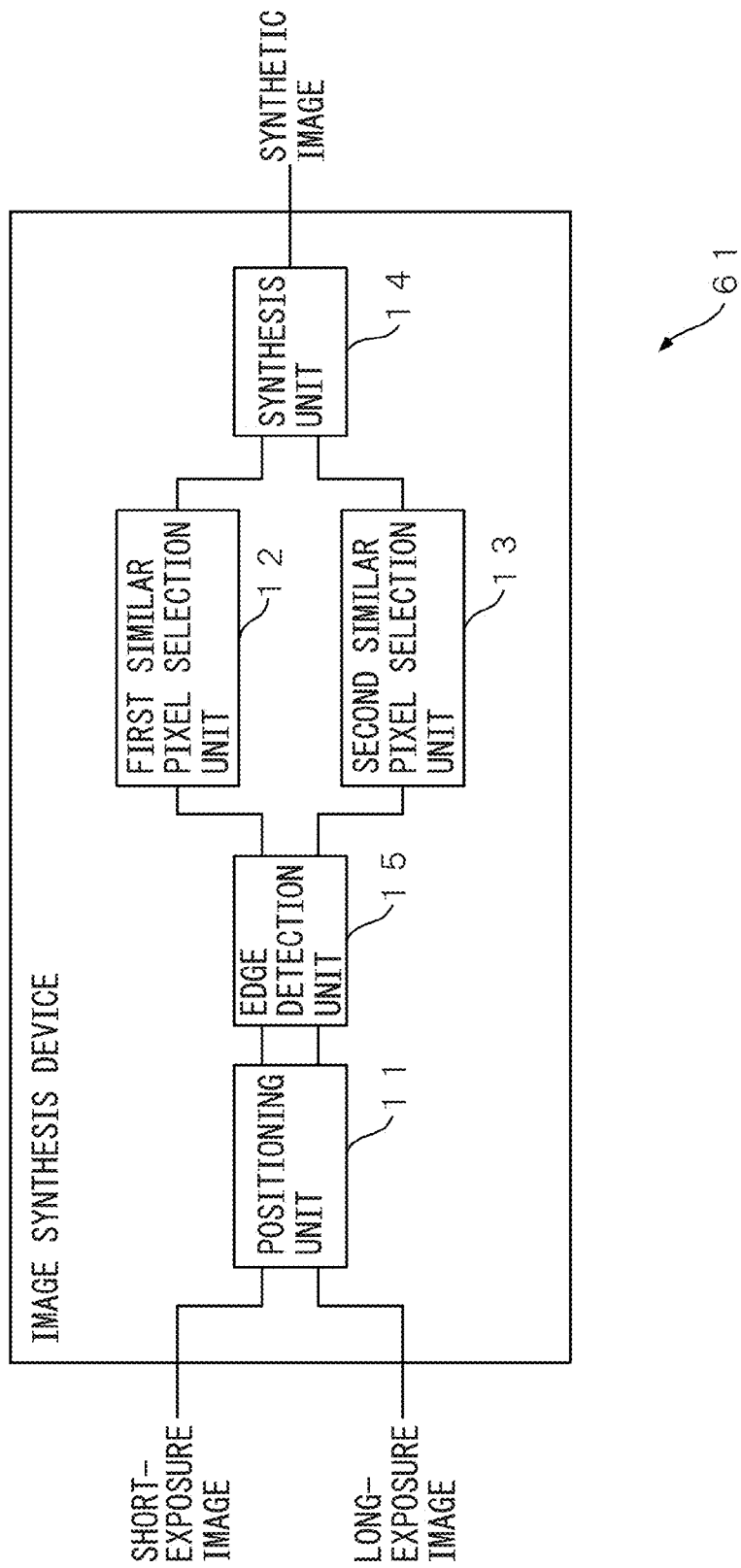
FIG. 6 is a configuration diagram of an image synthesis device according to a second embodiment.

FIG. 6 is a configuration diagram of an image synthesis device 61 according to the second embodiment. The image synthesis device 61 includes the positioning unit 11, the first similar pixel selection unit 12, the second similar pixel selection unit 13, the synthesis unit 14, and an edge detection unit 15. These units provided in the image synthesis device 61 may be formed as one integrated circuit in which circuits corresponding to the units are integrated. Alternatively, these units provided in the stereoscopic image generating device 6 may be formed as separate circuits.

In FIG. 6, components provided in the image synthesis device 61 are assigned the same reference numerals as the reference numerals of corresponding components provided in the image synthesis device 6 according to the first embodiment illustrated in FIG. 3. Compared to the image synthesis device 6 according to the first embodiment, the image synthesis device 61 according to the second embodiment is different in having the edge detection unit 15. The edge detection unit 15 and related parts will be described below.

Based on the long-exposure image and the short-exposure image, the positions of which have been matched by the positioning unit 11, the edge detection unit 15 decides whether or not the object's edges are captured, with respect to each pixel of the long-exposure image.

Figure 7:
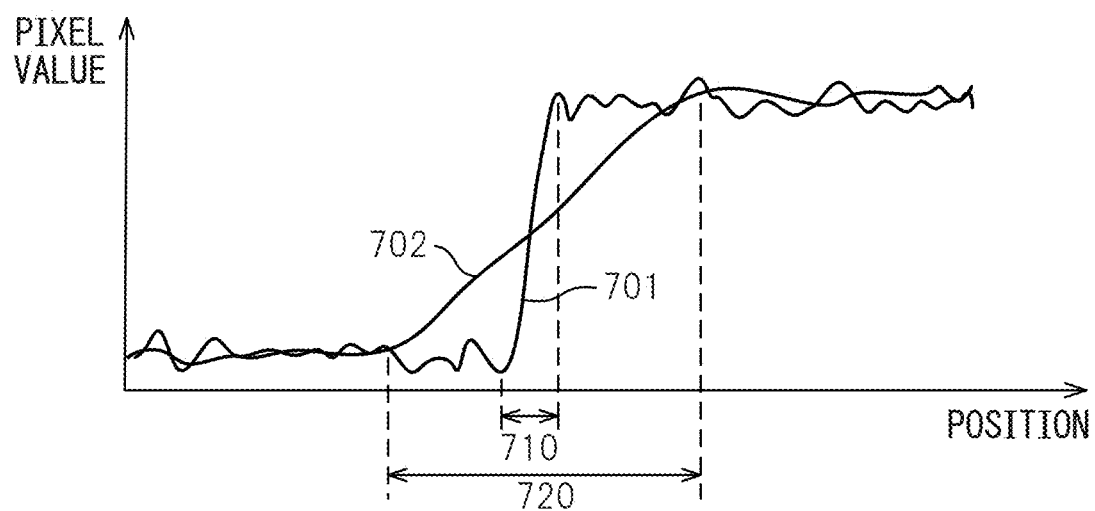
FIG. 7 is a diagram illustrating an example of profiles of pixel values with respect to edge parts of an object in a short-exposure image and a long-exposure image.

FIG. 7 is a diagram illustrating an example of profiles of pixel values with respect to edge parts of an object in a short-exposure image and a long-exposure image. In FIG. 7, the horizontal axis represents positions on images and the vertical axis represents the pixel values. Then, a profile 701 represents change of the pixel values in the edge part of the object in the short-exposure image. A profile 702 represents change of the pixel values in the edge part of the object in the long-exposure image when blur is produced due to camera shake.

As represented in the profile 701, there is not very much blur due to camera shake in the short-exposure image, and therefore, in an object's edge part 710, the pixel values change rapidly to the change of position in the edge part. On the other hand, as represented in the profile 702, blur due to camera shake is produced in the long-exposure image, and therefore an edge part 720 is wider than the edge part 710 in the short-exposure image, and change of the pixel values to the change of position in the edge part is moderate. As a result, in the edge part 720, although the same object is captured, difference in the pixel values is produced between the short-exposure image and the long-exposure image. On the other hand, apart from the edge part 720, the difference in the pixel values between the short-exposure image and the long-exposure image is very small.

Consequently, in the present embodiment, the edge detection unit 15 calculates the absolute value of the difference between the values of pixels located in the same position in the long-exposure image and the short-exposure image, as an edge detection value. Then, when the edge detection value is equal to or greater than a predetermined threshold value Th, the edge detection unit 15 decides that the object's edges are captured in the pixel on the long-exposure image. Note that, by calculating the absolute values of the differences between the pixel values corresponding to the edge parts of the object based on a plurality of samples of a pair of the short-exposure image and the long-exposure image, in which the same object is captured, the predetermined threshold value Th is set, for example, to the lower limit of the absolute values of the differences. For example, the threshold value Th is set to 5 when the pixel values are represented by 0 to 255.

Note that the edge detection unit 15 may use other methods of edge detection. Referring back to FIG. 7, when blur is produced in the long-exposure image due to camera shake, the difference values between nearby pixels in the edge part on the long-exposure image is smaller than the difference values between nearby pixels in the edge part on the short-exposure image. On the other hand, the difference values between nearby pixels in parts where a change of the pixel values are flat around the edge part on the long-exposure image is greater than the difference values between nearby pixels in the parts corresponding to the flat parts around the edge part on the short-exposure image. Then, the edge detection unit 15 may calculate the difference values by performing difference calculation between nearby pixels with respect to pixels located in the same positions in the short-exposure image and the long-exposure image, and obtain the absolute values of the differences between the difference values as edge detection values. Also in this case, when the edge detection value is equal to or greater than a predetermined threshold value, the edge detection unit 15 may decide that the edge captured in the pixel on the long-exposure image.

The edge detection unit 15 notifies the second similar pixel selection unit 13 of the coordinates of the pixels decided to capture the edge in the long-exposure image.

The second similar pixel selection unit 13 sets the filter area when the reference pixel is an edge pixel, to be larger than the filter area when the reference pixel is not the edge pixel. For example, when the reference pixel is the edge pixel, the filter area is set to a size of 9 vertical pixels×9 horizontal pixels around the reference pixel. On the other hand, when the reference pixel is not the edge pixel, the filter area is set to a size of 5 vertical pixels×5 horizontal pixels around the reference pixel.

When the long-exposure image is blurred due to camera shake, the edge part of the object on the image is wider than an original width thereof around an area where the edge of the object is captured. Therefore, it is difficult to detect, on the long-exposure image, pixel with the value which is the same as the pixel value of the pixel of interest in which the object is captured on the short-exposure image. In particular, in the above-described edge pixel detection method, edge pixels are detected when the edge of the object is not blurred in the short-exposure image while the edge of the object is blurred in the long-exposure image. Consequently, there is a high possibility that the object's edge, blurred due to camera shake, is captured in pixels that are determined to be edge pixels. However, in the present embodiment, when the reference pixel on the long-exposure image that is located in the same position as the pixel of interest in the short-exposure image is the edge pixel, the filter area set for the long-exposure image widens. Consequently, the second similar pixel selection unit 13 can easily detect pixels in which the same part as the part of the object captured in the pixel of interest is captured.

Note that, according to a modification, for each pixel on the long-exposure image, the edge detection unit 15 may notify the second similar pixel selection unit 13 of the edge detection value of the image. Then, as the edge detection value of the reference pixel is greater, the second similar pixel selection unit 13 may increase the size of the filter area where the reference pixel is set in the surrounding.

Next, an image synthesis device according to a third embodiment will be described. The image synthesis device according to the third embodiment estimates fluctuation widths of pixel values that are caused by a noise component superimposed in the long-exposure image and by a noise component superimposed in the short-exposure image. The wider the fluctuation widths are, the image synthesis device widens allowable ranges of a pixel value. The larger the noise components superimposed in these images are, the more the image synthesis device widens filter areas.

FIG. 8 illustrates a configuration of the image synthesis device 62 according to the third embodiment. The image synthesis device 62 includes a positioning unit 11, a noise component estimating unit 16, a first similar pixel selection unit 12, a second similar pixel selection unit 13, and a synthesis unit 14. These units provided in the image synthesis device 62 are formed as one integrated circuit in which circuits corresponding to the units are integrated. Alternatively, the units provided in the image synthesis device 62 are formed as separate circuits, respectively.

In FIG. 8, the components provided in the image synthesis device 62 are assigned the same reference numerals as the reference numerals of the corresponding components provided in the image synthesis device 6 according to the first embodiment illustrated in FIG. 3. The image synthesis device 62 according to the third embodiment differs from the image synthesis device 6 according to the first embodiment in that the image synthesis device 62 includes the noise component estimating unit 16, and differs in a method of setting the filter areas and the allowable ranges of pixel values in the first similar pixel selection unit 12 and the second similar pixel selection unit 13. Accordingly, in the following, the noise component estimating unit 16, the first similar pixel selection unit 12, and the second similar pixel selection unit 13 will be described.

The noise component estimating unit 16 estimates a fluctuation width of a pixel value that is caused by a noise component superimposed in the long-exposure image, and a fluctuation width of a pixel value that is by a noise component superimposed in the short-exposure image. Generally, the larger the noise component is, the larger the fluctuation of pixel values. As a result, standard deviation of pixel values becomes larger, as well. With regard to an area where an object including a decoration pattern is captured, the decoration pattern of the object causes the standard deviation of pixel values in the area to increase. For this reason, the noise component estimating unit 16 examines standard deviation of pixel values in an area where an object including the least amount of a decoration pattern is captured. In this manner, the noise component estimating unit 16 estimates the fluctuation widths of pixel values due to a noise component.

The noise component estimating unit 16 divides the long-exposure image and the short-exposure image into a plurality of sub-areas, for example, by dividing the long-exposure image and the short-exposure image, respectively into eight equal parts in a vertical direction and into eight equal parts in a horizontal direction. Then, for each of the sub-areas, the noise component estimating unit 16 multiplies each pixel included in the sub-area by an edge detecting filter such as a Laplacian filter or a Sobel filter to calculate a filtered value of each pixel. Subsequently, the noise component estimating unit 16 calculates the sum of the filtered values for each of the sub-areas. The noise component estimating unit 16 selects the sub-area having the minimum sum of the filtered values, as a flat area having the minimum fluctuation width of the pixel values due to the object, from a plurality of the sub-areas of the long-exposure image. Likewise, the noise component estimating unit 16 selects the sub-area having the minimum sum of the filtered values, as the flat area, from a plurality of the sub-areas of the short-exposure image.

In order to specify the flat area, the noise component estimating unit 16 may apply fast Fourier transformation to a plurality of the sub-areas, respectively. Then, the noise component estimating unit 16 may select, as the flat area, the sub-area having the minimum ratio for components of frequency larger than a predetermined frequency threshold to the entire frequency components. In this case, the frequency threshold may be the inverse number of a length of one side of the sub-area, for example.

The noise component estimating unit 16 calculates standard deviation $\alpha$ of pixel values of the flat area in the short-exposure image, as an index representing the fluctuation width of pixel values due to a noise component superimposed in the short-exposure image. Likewise, the noise component estimating unit 16 calculates standard deviation $\beta$ of pixel values of the flat area in the long-exposure image, as an index representing the fluctuation width of pixel values due to a noise component superimposed in the long-exposure image.

The noise component estimating unit 16 notifies the first similar pixel selection unit 12 and the similar pixel selection unit 13 of the standard deviation $\alpha$ and $\beta$.

The first similar pixel selection unit 12 sets the first allowable range on the basis of the standard deviation $\alpha$ of the pixel values of the flat area in the short-exposure image.

FIG. 9A illustrates a relationship between a noise component superimposed in the short-exposure image and the first allowable range. In FIG. 9A, the horizontal axis represents positions on the image, and the vertical axis represents pixel values. A profile 901 represents change in pixel values of the flat area in the short-exposure image.

As illustrated in FIG. 9A, almost entire pixels in the flat area (theoretically, 95.45% of pixels in the flat range) are included in a range extending by an amount of $\pm 2\alpha$ from the center that is the average value of the pixel values of the flat area in the short-exposure image. In other words, the fluctuation width of the pixel values due to the noise component is estimated to be $\pm 2\alpha$. In a certain case, a value of a pixel of interest is the minimum value or the maximum value in the fluctuation range. For example, in FIG. 9A, when the pixel 910 is a pixel of interest, the pixel value Pref of the pixel of interest is the minimum value of the pixel values included in the fluctuation width. In this case, in order for the entire fluctuation width of the pixel values to be included in the first allowable range, a range extending by an amount of $\pm 4\alpha$ from the pixel value of the pixel of interest is to be included in the first allowable range. For this purpose, the first similar pixel selection unit 12 uses, as the reference value Pref, the value of the pixel of interest to set the first allowable range to be a range extending from the value (Pref$-4\alpha$) to the value (Pref$+4\alpha$).

Likewise, the second similar pixel selection unit 13 sets the second allowable range on the basis of a noise component superimposed in the short-exposure image and a noise component superimposed in the long-exposure image.

FIG. 9B illustrates a relationship between the second allowable range and the noise component superimposed in the short-exposure image and the noise component superimposed in the long-exposure image. In FIG. 9B, the horizontal axis represents positions on the image, and the vertical axis represents pixel values. A profile 902 represents change in pixel values of the flat area in the long-exposure image.

As illustrated in FIG. 9B, almost of the entire pixels in the flat area are included in a range extending by an amount of $\pm 2\beta$ from the center that is the average value of the pixel values of the flat area in the long-exposure image. In other words, the fluctuation width of the pixel values due to the noise component is estimated to be $\pm 2\beta$. In a certain case, a value of a pixel of interest that is the center of the second allowable range is the minimum value or the maximum value in the fluctuation range of the pixel values in the short-exposure image. In this case, in the flat area, a difference between a value of the pixel of interest and the average value of the pixels in the long-exposure image becomes a value of approximately $2\alpha$. The reason of this is that adjusting a gain or the like for the short-exposure image causes a pixel value in the short-exposure image and a pixel value in the long-exposure image for the objects having the same brightness to become equal to each other. In this case, in order for the entire fluctuation width of the pixel values to be included in the second allowable range, a range extending by an amount of $\pm(2\alpha+2\beta)$ from the pixel value of the pixel of interest is included in the second allowable range. For this purpose, the second similar pixel selection unit 13 uses, as the reference value Pref, the value of the pixel of interest to set the second allowable range to be a range from the value (Pref$-(2\alpha+2\beta)$) to the value (Pref$+(2\alpha+2\beta)$).

Preferably, the first similar pixel selection unit 12 and the second similar pixel selection unit 13 set the filter areas to be larger as the noise components superimposed in the short-exposure image and the long-exposure image become larger. Thereby, even if the noise components are large, the first similar pixel selection unit 12 and the second similar pixel selection unit 13 more easily select the pixel having the same level of brightness as brightness of the object captured in the pixel of interest.

Since the long-exposure image is captured with appropriate exposure, the fluctuation width of pixel values due to the noise component is generally small. Accordingly, the standard deviation $\beta$ in the flat area is small, as well. Even if an amount of the exposure is slightly reduced, the standard deviation $\beta$ is less increased since contribution of the noise component to pixel values is small. Meanwhile, the short-exposure image is obtained with an amount of exposure smaller than an amount of exposure of the long-exposure image. Accordingly, as an amount of exposure decreases, contribution of the noise component to pixel values sharply increases. For this reason, as an amount of exposure decreases, the standard deviation α in the flat area changes more largely than the standard deviation β. In view of it, as a value of α/β becomes larger, the first similar pixel selection unit 12 and the second pixel selection unit 13 estimates the noise components to be larger, the noise components being superimposed in the long-exposure image and the short exposure image. As a value of α/β becomes larger, the first similar pixel selection unit 12 and the second pixel selection unit 13 widen the filter areas.

For example, when the inequality 1.00<α/β≤2.00 is satisfied, the first similar pixel selection unit 12 sets a size of the first filter area to be a size of 3 vertical pixels×3 horizontal pixels, the first filter being set for the short-exposure image. The second similar pixel selection unit 13 sets a size of the second filter area to be a size of 7 vertical pixels×7 horizontal pixels, the second filter being set for the long-exposure image.

When the inequality 2.00<α/β≤4.00 is satisfied, the first similar pixel selection unit 12 sets a size of the first filter area to be a size of 5 vertical pixels×5 horizontal pixels. The second similar pixel selection unit 13 sets a size of the second filter area to be a size of 9 vertical pixels×9 horizontal pixels.

Further, when a value of α/β is larger than 4.00, the first similar pixel selection unit 12 sets a size of the first filter area to be a size of 7 vertical pixels×7 horizontal pixels. The second similar pixel selection unit 13 sets a size of the second filter area to be a size of 11 vertical pixels×11 horizontal pixels.

The first similar pixel selection unit 12 selects a pixel having a pixel value included in the first allowable range in the filter area of the short-exposure image. The second similar pixel selection unit 13 selects a pixel having a pixel value included in the second allowable range in the filter area of the long-exposure image. The synthesis unit 14 synthesizes values of the pixel of interest on the basis of the values of the selected pixels.

As described above, the image synthesis device according to the third embodiment estimates the fluctuation widths of the pixel values due to the noise components superimposed in the short-exposure image and the long-exposure image, and on the basis of the estimation result, automatically causes the allowable ranges and the filter areas of pixel values to be appropriately adjusted.

According to a modified example, the noise component estimating unit 16 may also calculate, as the fluctuation width of the pixel values due to the noise component in the short-exposure image, a difference d1 between the maximum value and the minimum value of the pixels in the flat area in the short-exposure image. Likewise, the noise component estimating unit 16 may also calculate, as the fluctuation width of the pixel values due to the noise component in the long-exposure image, a difference d2 between the maximum value and the minimum value of the pixels in the flat area in the long-exposure image. In this case, the difference d1 corresponds to the value 2α. Likewise, the difference d2 corresponds to the value 2β. Accordingly, the first similar pixel selection unit 12 may use a value of the pixel of interest as the reference value Pref to set the first allowable range to be a range extending from the value (Pref−d1) to the value (Pref+d1). The second similar pixel selection unit 13 may use a value of the pixel of interest as the reference value Pref to set the second allowable range to be a range extending from the value (Pref−(d1+d2)/2) to the value (Pref+(d1+d2)/2).

Note that the present invention is by no means limited to the above embodiments. According to a modification of each embodiment described above, the synthesis unit 14 may calculate the pixel values of the synthetic image by calculating a weighted average of the values of pixels selected from the long-exposure image and the values of pixels selected from the short-exposure image. In this case, the synthesis unit 14 may calculate the pixel value P of the synthetic image according to, for example, the following equation.

$$P = \frac{\sum_{i=1}^{m} w_l p_i + \sum_{j=1}^{n} w_s q_j}{m w_l + n w_s} \quad \text{(Equation 1)}$$

where $w_l$ is a weighting coefficient for pixels selected from the long-exposure image, and $w_s$ is a weighting coefficient for pixels selected from the short-exposure image. Furthermore, $p_i$ (i=1, 2, . . . , m) are the values of pixels selected from the long-exposure image, and $q_j$ (j=1, 2, . . . , n) are the values of pixels selected from the short-exposure image. Then, m and n are the number of pixels selected from the long-exposure image and the number of pixels selected from the short-exposure image, respectively.

When, for example, the long-exposure image is photographed under conditions without camera shake, the synthesis unit 14 sets the weighting coefficient $w_l$ greater than the weighting coefficient $w_s$. On the other hand, when the long-exposure image is photographed with camera shake, the synthesis unit 14 sets the weighting coefficient $w_l$ smaller than the weighting coefficient $w_s$.

As for the long-exposure image, when the image is photographed without camera shake, there is little blur due to camera shake. Consequently, by setting the weighting coefficients in this way, the image synthesis device is able to further reduce the noise components in each pixel value of the synthetic image, and improve the image quality of the synthetic image. On the other hand, when the long-exposure image is photographed under conditions with camera shake, by increasing the weighting coefficient for the short-exposure image, the image synthesis device is able to further reduce the blur due to camera shake.

To decide whether or not the long-exposure image is photographed without camera shake, the synthesis unit 14 acquires the shutter speed at the time of photographing of the long-exposure image, from the control unit 7 of the imaging device 1. When the shutter speed at the time of photographing of the long-exposure image is equal to or greater than a threshold value corresponding to the lower limit value of the shutter speed where little camera shake may be produced, the synthesis unit 14 decides that the long-exposure image is photographed without camera shake, and sets the weighting coefficient $w_l$ greater than the weighting coefficient $w_s$. On the other hand, when the shutter speed at the time of photographing of the long-exposure image is lower than the threshold value, the synthesis unit 14 decides that the long-exposure image is photographed with camera shake, and sets the weighting coefficient $w_l$ smaller than the weighting coefficient $w_s$. Note that the lower limit value of the shutter speed where little camera shake may be produced is generally the reciprocal of the focal distance of the imaging optical system of the camera module 2 in 35-mm film equivalent.

Alternatively, when an acceleration sensor is mounted on the imaging device 1, the synthesis unit 14 may use the acceleration measured by the acceleration sensor, instead of the shutter speed, to decide whether or not the long-exposure image is photographed without camera shake. For example, when the acceleration measured by the acceleration sensor at the time of photographing of the long-exposure image is equal to or greater than a threshold value corresponding to the upper limit value of acceleration where little camera shake may be produced, the synthesis unit 14 decides that the long-exposure image is photographed under conditions without camera shake.

According to another modification, the positioning unit may be omitted. The image synthesis device according to the embodiments sets, with respect to the long-exposure image, a filter area having a certain size, around the reference pixel in the same position as the pixel of interest on the short-exposure image, and selects, in the filter area, pixels with pixel values close to the value of the pixel of interest. Consequently, the image synthesis device is able to select pixels where the same part as the part of the object captured in the pixel of interest is captured, from the long-exposure image, even when the position of the image of the object captured in the short-exposure image and the position of the image of the object captured in the long-exposure image are somewhat different.

According to still another modification, the image synthesis device may make different the width from the value of the pixel of interest on the short-exposure image to the upper limit, and the width from the value of the pixel of interest to the lower limit, with respect to at least one of the first and second allowable ranges.

According to yet another modification, the image synthesis device may synthesize three or more images of exposure times of which are different from each other. In this case, the image synthesis device makes the image of the minimum exposure time be the short-exposure image. Then, with respect to each image having a longer exposure time than that of the short-exposure image, the second similar pixel selection unit 13 may select pixels with pixel values within the second allowable range, from the filter area that is set around the reference pixel located in the same position as the pixel of interest on the short-exposure image, like the above-described embodiments. Then, the synthesis unit 14 is able to find the value of the pixel on the synthetic image in the same position as the pixel of interest, by synthesizing all the selected pixel values.

Furthermore, according to yet another modification, instead of the control unit 7, the image synthesis device may adjust the color balance of a corrected image, and execute processes such as edge emphasis or contrast emphasis.

The functions of the units of the image synthesis devices according to the above embodiments or their variations may be implemented by a computer program executed on a processor. Such a computer program may be provided recorded on a computer-readable recording medium such as a magnetic recording medium, optical recording medium, and so on. However, this recording medium does not include carrier waves.

FIG. 8 is a configuration diagram of a computer that operates as an image synthesis device by executing a computer program to realize the functions of the units of the image synthesis device according to each embodiment or its variation. A computer 100 includes a user interface unit 101, a communication interface unit 102, a storage unit 103, a storage medium access device 104, and a processor 105. The processor 105 is connected with the user interface unit 101, the communication interface unit 102, the storage unit 103 and the storage medium access device 104, for example, via a bus.

The user interface unit 101 includes, for example, an input device such as a keyboard and a mouse, and a display device such as a liquid crystal display. Alternatively, the user interface unit 101 may include a device that integrates the input device and the display device, such as a touch panel display. The user interface unit 101 outputs, for example, an operation signal to start the image synthesis process, in response to user operation, to the processor 105.

The communication interface unit 102 may include a communication interface and a control circuit for the communication interface, for connecting the computer 100 with the imaging device (not illustrated) that is capable of generating a plurality of images of varying exposure times. This communication interface may be, for example, a universal serial bus (USB).

Furthermore, the communication interface unit 102 may include a communication interface and a control circuit for the communication interface, for connecting with a communication network in compliance with a communication standard such as Ethernet (registered trademark). In this case, the communication interface unit 102 acquires the long-exposure image and the short-exposure image from another device connected to the communication network and stores these images in the storage unit 103. Furthermore, the communication interface unit 102 may output the synthetic image received from the processor 105 to other devices via the communication network.

The storage unit 103 may include, for example, a readable and writable semiconductor memory and a read-only semiconductor memory. The storage unit 103 stores a computer program for executing the image synthesis process, which is executed on the processor 105, and intermediate calculation results acquires during the image synthesis process. Furthermore, the storage unit 103 stores the image received via the communication interface unit 102, the synthetic image generated by the processor 105, and so on.

The storage medium access device 104 is a device to access the storage medium 106 such as a magnetic disk, a semiconductor memory card, or an optical storage medium. The storage medium access device 104 reads the computer program for the image synthesis process, that is stored in the storage medium 106 and that is to be executed on the processor 105, and passes this computer program to the processor 105. The storage medium access device 104 may write the synthetic image that is generated by the processor 105, in the storage medium 106.

The processor 105 generates the synthetic image with reduced blur due to camera shake and with reduced noise components, by executing the computer program for image synthesis process according to the above-described embodiments or modification examples. Then, the processor 105 saves the generated synthetic image in the storage unit 103, or outputs the generated synthetic image to other devices via the communication interface unit 102.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An image synthesis device that generates a synthetic image by synthesizing a first image and a second image of a longer exposure time than the first image, the image synthesis device comprising:

a first pixel selection unit which sets a first filter area around a pixel of interest on the first image, and which selects, from the first filter area, a first pixel having a value within a first allowable range which includes a value of the pixel of interest and is set based on the value of the pixel of interest;

a second pixel selection unit which sets a second filter area around a reference pixel that is located on the second image in a same position as the pixel of interest, and which selects, from the second filter area, a second pixel having a value within a second allowable range which includes the value of the pixel of interest on the first image and is set based on the value of the pixel of interest in the first image; and a synthesis unit which sets a synthetic value, acquired by synthesizing the value of the first pixel and the value of the second pixel, as a value of a pixel located on the synthetic image in the same position as the pixel of interest.

2. The image synthesis device according to claim 1, further comprising a positioning unit that matches a position of an object captured on the first image with a position of the object captured on the second image, wherein the second pixel selection unit determines the reference pixel based on the first image and the second image in which the positions of the object are matched.

3. The image synthesis device according to claim 1, wherein, when the second image is photographed without camera shake, the synthesis unit calculates the synthetic value by setting a first weighting coefficient corresponding to the first pixel smaller than a second weighting coefficient corresponding to the second pixel and calculating a weighted average of the value of the first pixel and the value of the second pixel, while, when the second image is photographed under conditions with camera shake, the synthesis unit calculates the synthetic value by setting the first weighting coefficient greater than the second weighting coefficient and calculating the weighted average of the value of the first pixel and the value of the second pixel.

4. The image synthesis device according to claim 1, further comprising an edge detection unit that decides whether or not an edge of the object is captured, for each pixel of the second image, wherein the second pixel selection unit sets a size of the second filter area when the reference pixel is decided to be a pixel where the edge of the object is captured, larger than a size of the second filter area when the reference pixel is decided to be a pixel where the edge of the object is not captured.

5. The image synthesis device according to claim 1, wherein the second allowable range is narrower than the first allowable range.

6. The image synthesis device according to claim 1, wherein the size of the second filter area is larger than the size of the first filter area.

7. The image synthesis device according to claim 1, further comprising a noise component estimating unit that estimates a first fluctuation width of pixel values due to a noise component superimposed in the first image, and a second fluctuation width of pixel values due to a noise component superimposed in the second image, and wherein as the first fluctuation width becomes larger, the first pixel selection unit widens the first allowable range, and as both the first fluctuation width and the second fluctuation width become larger, the second pixel selection unit widens the second allowable range.

8. The image synthesis device according to claim 7, wherein as a ratio of the first fluctuation width to the second fluctuation width becomes larger, the first pixel selection unit widens the first filter area, and as the ratio of the first fluctuation width to the second fluctuation width becomes larger, the second pixel selection unit widens the second filter area.

9. The image synthesis device according to claim 7, wherein the noise component estimating unit divides the first image into a plurality of sub areas, calculates, as an index representing the first fluctuation width, first standard deviation of pixel values in the sub area having the least pixel value fluctuation among the plurality of sub areas divided from the first image, divides the second image into a plurality of sub areas, and calculates, as an index representing the second fluctuation width, second standard deviation of pixel values in the sub area having the least pixel value fluctuation among the plurality of sub areas divided from the second image, as the first standard deviation becomes larger, the first pixel selection unit widens the first allowable range, and as a sum of the first standard deviation and the second standard deviation becomes larger, the second pixel selection unit widens the second allowable range.

10. The image synthesis device according to claim 1, wherein the synthetic value is a mean value or median of the value of the first pixel and the value of the second pixel.

11. A non-transitory computer-readable storage medium storing a computer program for synthetic image generation to cause a computer to generate a synthetic image by synthesizing a first image and a second image of a longer exposure time than the first image, the computer program causing a computer to execute:

setting a first filter area around a pixel of interest on the first image, and selecting, from the first filter area, a first pixel having a value within a first allowable range which includes a value of the pixel of interest and is set based on the value of the pixel of interest;

setting a second filter area around a reference pixel that is located on the second image in a same position as the pixel of interest, and selecting, from the second filter area, a second pixel having a value within a second allowable range which includes the value of the pixel of interest on the first image and is set based on the value of the pixel of interest on the first image; and setting a synthetic value, acquired by synthesizing the value of the first pixel and the value of the second pixel, as a value of a pixel located on the synthetic image in the same position as the pixel of interest.

12. The computer-readable storage medium according to claim 11, the computer program for synthetic image generation to cause a computer to further execute: matching a position of an object captured on the first image with a position of the object captured on the second image, wherein the setting a second filter area determines the reference pixel based on the first image and the second image in which the positions of the object are matched.

13. The computer-readable storage medium according to claim 11, wherein, when the second image is photographed without camera shake, the setting a synthetic value calculates the synthetic value by setting a first weighting coefficient corresponding to the first pixel smaller than a second weighting coefficient corresponding to the second pixel and calculating a weighted average of the value of the first pixel and the value of the second pixel, while, when the second image is photographed under conditions with camera shake, the setting a synthetic value calculates the synthetic value by setting the first weighting coefficient greater than the second weighting coefficient and calculating the weighted average of the value of the first pixel and the value of the second pixel.

14. The computer-readable storage medium according to claim 11,
the computer program for synthetic image generation to cause a computer to further execute: deciding whether or not an edge of the object is captured, for each pixel of the second image,
wherein the setting a second filter area sets a size of the second filter area when the reference pixel is decided to be a pixel where the edge of the object is captured, larger than a size of the second filter area when the reference pixel is decided to be a pixel where the edge of the object is not captured.

15. The computer-readable storage medium according to claim 11, wherein the second allowable range is narrower than the first allowable range.

16. The computer-readable storage medium according to claim 11, wherein the size of the second filter area is larger than the size of the first filter area.

17. The computer-readable storage medium according to claim 11,
the computer program for synthetic image generation to cause a computer to further execute: estimating a first fluctuation width of pixel values due to a noise component superimposed in the first image, and a second fluctuation width of pixel values due to a noise component superimposed in the second image, and
wherein
as the first fluctuation width becomes larger, the setting the first filter widens the first allowable range, and
as both the first fluctuation width and the second fluctuation width become larger, the setting the second filter widens the second allowable range.

18. The computer-readable storage medium according to claim 17, wherein
as a ratio of the first fluctuation width to the second fluctuation width becomes larger, the setting the first filter widens the first filter area, and
as the ratio of the first fluctuation width to the second fluctuation width becomes larger, the setting the second filter widens the second filter area.

19. The computer-readable storage medium according to claim 17, wherein
the estimating the first fluctuation width divides the first image into a plurality of sub areas, calculates, as an index representing the first fluctuation width, first standard deviation of pixel values in the sub area having the least pixel value fluctuation among the plurality of sub areas divided from the first image, and the estimating the second fluctuation width divides the second image into a plurality of sub areas, and calculates, as an index representing the second fluctuation width, second standard deviation of pixel values in the sub area having the least pixel value fluctuation among the plurality of sub areas divided from the second image,
as the first standard deviation becomes larger, the setting the first filter widens the first allowable range, and
as a sum of the first standard deviation and the second standard deviation becomes larger, the setting the second filter widens the second allowable range.

20. The computer-readable storage medium according to claim 11, wherein the synthetic value is a mean value or median of the value of the first pixel and the value of the second pixel.

21. An image synthesis device comprising:
an imaging unit which generates a first image and a second image having a longer exposure time than the first image; and
a processor adapted to:
set a first filter area around a pixel of interest on the first image, and select, from the first filter area, a first pixel having a value within a first allowable range which includes a value of the pixel of interest and is set based on the value of the pixel of interest;
set a second filter area around a reference pixel that is located on the second image in a same position as the pixel of interest, and select, from the second filter area, a second pixel having a value within a second allowable range which includes the value of the pixel of interest on the first image and is set based on the value of the pixel of interest on the first image; and
set a synthetic value, acquired by synthesizing the value of the first pixel and the value of the second pixel, as a value of a pixel located on the synthetic image in the same position as the pixel of interest.

* * * * *